J. T. & C. W. KEMPER.
ADJUSTABLE LABORATORY GAS BURNER.
APPLICATION FILED APR. 3, 1916.
1,262,354.
Patented Apr. 9, 1918.
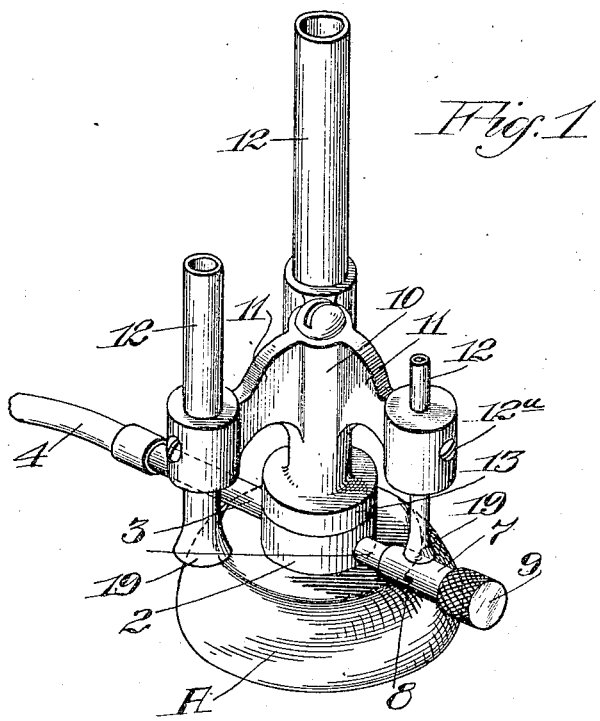
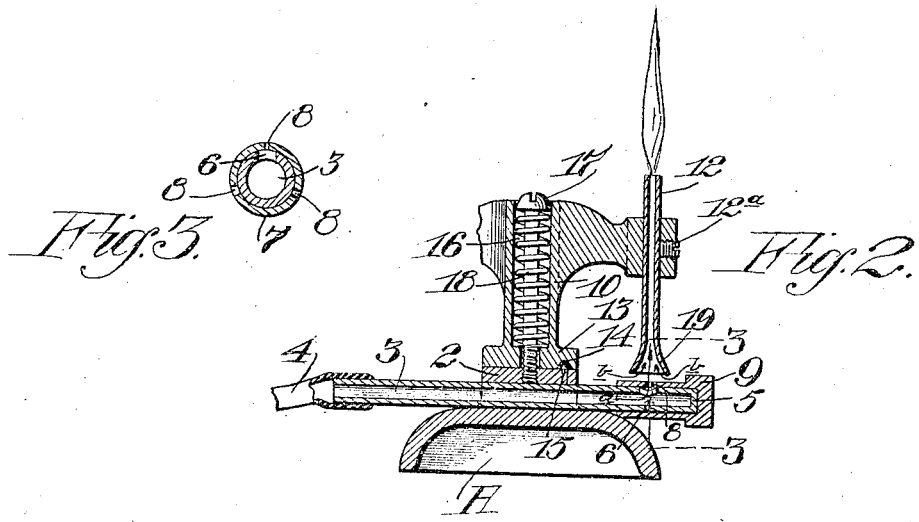
WITNESSES:
INVENTOR
ATTORNEY

UNITED STATES PATENT OFFICE.

JOHN T. KEMPER AND CHARLES W. KEMPER, OF OAKLAND, CALIFORNIA.

ADJUSTABLE LABORATORY GAS-BURNER.

1,262,354.                    Specification of Letters Patent.        Patented Apr. 9, 1918.

Application filed April 3, 1916. Serial No. 88,501.

*To all whom it may concern:*

Be it known that we, JOHN T. KEMPER and CHARLES W. KEMPER, citizens of the United States, residing at Oakland, in the county of Alameda and State of California, have invented new and useful Improvements in Adjustable Laboratory Gas-Burners, of which the following is a specification.

This invention relates to a gas burner.

One of the objects of the present invention is to provide a simple, substantial burner of the "Bunsen" type, particularly adapted for laboratory, jewelry, dental and like work, where a steady, small flame of high temperature is required.

Another object of the invention is to provide a gas supply pipe having a discharge orifice, the size of which may be increased or decreased, and in connection therewith an adjustable head carrying a plurality of mixing tubes enlarged at their lower ends and adapted to be moved into alinement with the discharge orifice, said tubes being of graduated length and of increasing interior diameter, thus making it possible to produce flames of varying size and temperature.

Further objects will hereinafter appear.

The invention consists of the parts and the construction and combination of parts as hereinafter more fully described and claimed, having reference to the accompanying drawings in which—

Figure 1 is a perspective view of the burner.

Fig. 2 is a central vertical section through same.

Fig. 3 is a cross section on line 3—3, Fig. 2.

Referring to the drawings in detail, A indicates a suitable shaped base or holder provided with a central extension 2 through which extends a gas supply pipe 3. One end of the pipe is connected with a suitable source of supply by means of a hose 4, while the other end of the pipe is closed as at 5 and provided with a discharge orifice 6. Turnably mounted on the closed end of the tube is a cap 7 in which is formed a plurality of graduated openings 8. The outer end of the cap is provided with a head 9 by which the cap may be turned to bring any one of the graduated openings 8 into or out of alinement with the main discharge orifice 6. Turnably mounted on the central extension 2 formed on the base is a head member 10 which is provided with a plurality of radially disposed arms 11, each of which carries a mixing tube 12; the tubes being of varying length and increasing diameter as shown. Each tube is vertically adjustable in its carrying arm 11 and may be secured in any adjusted position by means of a set screw $12^a$. The lower end of the head 10 is enlarged as at 13 and the underside of said enlarged end is provided with a plurality of recesses 14, one recess being positioned in alinement with each radially disposed arm 11. Projecting upwardly from the extension 2 is a stationary pin 15. This pin is mounted in alinement with the supply tube 3 and forms an automatic lock for securing the head 10 against turning movement when any one of the mixing tubes 12 are brought into alinement with the discharge orifice 6. The head proper is provided with a central recess 16, through which extends a screw 17 secured in the extension 2 on the base. Interposed between the head of the screw 17 and the lower end of the recess is a coil spring 18 which normally forces the head down against the face of the extension 2, thus forming a means for automatically retaining the pin in any registering recess 14. If it is desired to move a mixing tube into alinement with the discharge orifice, it is only necessary to grasp the head and raise it sufficiently against the tension of the spring 18 to permit the recesses in the head to clear the pin 15. It is then possible to turn the head until any desired mixing tube moves into alinement with the discharge orifice. The spring will here force the head down the moment a recess 14 registers with the pin 15 and will thus automatically lock or retain the head against turning movement while a mixing tube is in position. The lower end of each mixing tube is cone-shaped, as shown at 19. The operation will be as follows:

The openings 8 formed in the turnable cap 7 are graduated in size to supply a given volume of gas to each mixing tube 12. If the small mixing tube is moved into alinement with the discharge orifice, a comparatively small volume of gas will be required. It is therefore only necessary to turn the cap by means of the head 9 until the smallest opening 8 in the cap moves into alinement with the discharge orifice 6. The gas will thus pass through the orifice 6 and the smallest discharge opening 8 in the direction of arrow $a$, directly into the lower cone-shaped end of the smallest tube 12 and will create a jet action which causes an in-rush of air in the direction of arrows $b$. A perfect and proportional mixture of air and gas is thus obtained by the provision of the mixing tube, and this mixture, when ignited at the upper end of the tube, will form a pointed blue flame of high temperature. If it is desired to use a larger flame, it is only necessary to move the second size mixing tube into alinement with the discharge orifice and to supply a proportionately larger volume of gas by turning the cap by means of the head 9 until the second size graduated opening 8 registers with the discharge orifice 6. A larger volume of gas and air will thus enter the lower end of the mixing tube and consequently produce a larger size flame than was secured by the smallest tube. While three mixing tubes are here shown, it is obvious that the number and size of same may be varied to suit various conditions and requirements. The cone shape on the lower end of each mixing tube forms one of the important features of the present invention. This permits the admission of a larger volume of air, thus producing a more perfect combustion and also permits the use of a comparatively small mixing tube. In actual practice, it has been found possible to use a mixing tube less than a thirty-second of an inch in diameter. This produces a small blue pointed flame of intense heat which is particularly adapted for use as a pilot light in connection with lamps and other gas burners and also for certain kinds of laboratory work.

The materials and finish of the several parts of the invention may be such as the judgment and experience of the manufacturer may dictate.

We wish it understood that various changes in form, proportions and minor details of construction may be resorted to within the scope of the appended claims and that we do not wish to limit ourselves to the specific design and construction here shown.

Having thus described our invention, what we claim and desire to secure by Letters Patent is—

1. A burner comprising a base member, a head turnably mounted on said base, a plurality of radially disposed arms on the head member, a vertically positioned tube carried by each arm, said tubes being graduated in size and having bell-shaped mouths formed on their lower ends, means for adjusting each tube vertically independently of each other, a gas discharging orifice in the base, and means for locking the head against turning when a tube is in alinement with said orifice.

2. A gas burner comprising a base, a gas supply pipe carried by the base having a discharge orifice formed therein, a mixing tube mounted in alinement with the discharge orifice and spaced therefrom, a tubular shaped cap on one end of the supply pipe adapted to form a closure for the discharge orifice, said cap having a plurality of graduated discharge openings formed therein positioned in alinement with the orifice, and means for turning the cap to bring any one of the graduated openings into or out of register with the discharge orifice.

3. A gas burner comprising a base, a gas supply pipe carried by the base having a discharge orifice formed therein, a head member mounted on the base, a plurality of radially disposed spider arms, carried by the head, a plurality of graduated mixing tubes one mounted at the end of each arm, and means for turning the head to bring any tube into alinement with the discharge orifice in the gas supply pipe.

4. A gas burner comprising a base, a gas supply pipe carried by the base having a discharge orifice formed therein, a head member mounted on the base, a plurality of radially disposed spider arms formed on the head, a plurality of graduated mixing tubes carried by the head, one mounted at the end of each arm, means for turning the head to bring any tube into alinement with the discharge orifice in the gas supply pipe, and means for locking the head against turning movement when any mixing tube is positioned in alinement with the said discharge orifice.

5. A gas burner comprising a base, a gas supply pipe carried by the base having a discharge orifice formed therein, a head member mounted on the base, a plurality of radially disposed spider arms formed on the head, a plurality of graduated mixing tubes carried by the head, one mounted at the end of each arm, means for turning the head to bring any tube into alinement with the discharge orifice in the gas supply pipe, and means for automatically locking the head against turning movement when any mixing tube is positioned in alinement with the said discharge orifice.

6. A gas burner comprising a base, a gas supply pipe carried by the base having a discharge orifice formed therein, a head member mounted on the base, a plurality of graduated mixing tubes carried by the head, means for turning the head to bring any tube into alinement with the discharge orifice in the gas supply pipe, a cap on one end of the supply pipe adapted to form a closure for the discharge orifice, said cap having a plurality of graduated discharge openings formed therein positioned in alinement with the orifice, and means for turning the cap to bring any one of the graduated openings into or out of register with the discharge orifice.

7. A burner comprising a base member, a head turnably mounted on said base, a plurality of radially disposed arms on the head member, a vertically positioned tube carried by each arm, said tubes being graduated in size and having bell-shaped mouths formed on their lower ends, means for adjusting each tube vertically independently of each other, a gas discharging orifice in the base, means for locking the head against turning when a tube is in alinement with said orifice, said means comprising a stud secured in the base about which the head is adapted to turn, a plurality of recesses formed in the bottom face of the head, a pin in the base adapted to enter any one of said recesses, and a spring surrounding the stud adapted to force the head down on the pin.

In testimony whereof we have hereunto set our hands in the presence of two subscribing witnesses.

JOHN T. KEMPER.
CHARLES W. KEMPER.

Witnesses:
JOHN H. HERRING,
W. W. HEALEY.

Copies of this patent may be obtained for five cents each, by addressing the "Commissioner of Patents, Washington, D. C."